United States Patent
Paredes

(10) Patent No.: US 7,235,183 B2
(45) Date of Patent: Jun. 26, 2007

(54) GLYCERINE FOOTS SALT SEPARATION SYSTEM

(75) Inventor: Hernan D. Paredes, San Pedro Sula (HN)

(73) Assignee: Crown Iron Works Company, Roseville, MN (US)

( * ) Notice: Subject to any disclaimer, the term of this patent is extended or adjusted under 35 U.S.C. 154(b) by 0 days.

(21) Appl. No.: 10/873,683

(22) Filed: Jun. 22, 2004

(65) Prior Publication Data

US 2005/0279718 A1  Dec. 22, 2005

(51) Int. Cl.
*B01D 21/00* (2006.01)

(52) U.S. Cl. .................. 210/803; 210/532.1; 210/540; 568/869

(58) Field of Classification Search ................ 210/95, 210/513, 532.1, 538, 540; 568/869; 422/902
See application file for complete search history.

(56) References Cited

U.S. PATENT DOCUMENTS

| | | | | |
|---|---|---|---|---|
| 1,620,431 A * | 3/1927 | Bramwell | ................... | 210/189 |
| 1,885,166 A * | 11/1932 | Wurster | ...................... | 203/26 |
| 1,890,516 A * | 12/1932 | Lachman | ................... | 208/203 |
| 1,945,281 A * | 1/1934 | Leithauser | .................... | 159/45 |
| 2,012,567 A * | 8/1935 | Kerns et al. | ................. | 209/725 |
| 2,113,841 A * | 4/1938 | Henshaw | ...................... | 196/98 |
| 2,182,179 A * | 12/1939 | Potts et al. | ................. | 568/869 |
| 2,355,564 A * | 8/1944 | Sebald | ........................ | 210/713 |
| 2,383,579 A * | 8/1945 | Allen et al. | ................. | 554/167 |
| 2,383,599 A * | 8/1945 | Glossop | ....................... | 554/167 |
| 2,383,614 A * | 8/1945 | Percy | .......................... | 554/167 |
| 2,383,632 A * | 8/1945 | Trent | .......................... | 554/167 |
| RE22,751 E * | 4/1946 | Trent | .......................... | 554/167 |
| 2,444,296 A * | 6/1948 | Keim et al. | ................. | 568/672 |
| 2,631,926 A * | 3/1953 | Eckstrom | ..................... | 422/252 |
| 2,717,271 A * | 9/1955 | Rowe | .......................... | 568/621 |
| 2,726,937 A * | 12/1955 | Lachampt | .................... | 422/189 |
| 2,758,122 A * | 8/1956 | Clayton | ...................... | 552/545 |
| 3,369,976 A * | 2/1968 | Temple et al. | ............. | 202/236 |
| 3,817,384 A * | 6/1974 | Tanaka et al. | .............. | 210/177 |
| 3,855,079 A * | 12/1974 | Greenfield et al. | ........... | 203/47 |
| 3,870,735 A * | 3/1975 | Stein et al. | ................. | 554/185 |
| 3,912,578 A * | 10/1975 | Didycz et al. | ............. | 159/20.1 |
| 3,947,327 A * | 3/1976 | Greenfield et al. | ............ | 203/7 |
| 3,950,230 A * | 4/1976 | Greenfield et al. | ........... | 203/47 |
| 4,053,525 A | 10/1977 | Saletan et al. | .......... | 260/635 E |
| 4,164,507 A * | 8/1979 | Blytas et al. | ................ | 554/177 |
| 4,236,896 A * | 12/1980 | Morris et al. | ............. | 23/293 R |
| 4,360,407 A | 11/1982 | Reierson | ...................... | 203/34 |
| 4,560,812 A | 12/1985 | Blytas | ......................... | 568/869 |
| 4,599,178 A | 7/1986 | Blytas | ......................... | 210/737 |
| 4,662,990 A * | 5/1987 | Bonanno | .................... | 159/20.1 |
| 4,683,347 A | 7/1987 | Diaz et al. | .................. | 568/869 |
| 5,190,622 A | 3/1993 | Berg | ........................... | 203/60 |
| 5,198,077 A | 3/1993 | Berg | ........................... | 203/60 |
| 5,209,828 A * | 5/1993 | Chou et al. | ................... | 203/88 |
| 5,338,530 A | 8/1994 | Thunberg | .................... | 423/551 |
| 5,421,965 A | 6/1995 | Berg | ........................... | 203/58 |
| 5,871,618 A * | 2/1999 | Lee et al. | .................. | 196/46.1 |
| 6,444,095 B1* | 9/2002 | Evans et al. | ................ | 202/174 |
| 2005/0279718 A1* | 12/2005 | Paredes | ....................... | 210/803 |

* cited by examiner

*Primary Examiner*—Robert James Popovics
(74) *Attorney, Agent, or Firm*—Nawrocki, Rooney & Sivertson, P.A.

(57) ABSTRACT

The present invention provides a method and apparatus for the recovery of salt from a glycerine process, allowing the salt to be used in a brine solution. A salt settling tank is positioned inline between the foots from a crude still bottom and a foot still. Salt settles to the bottom of the settling tank and into a salt receiver positioned below, while clarified liquid overflows to the foot still. Salt from the salt receiver is then semi-continuously transferred into a salt extractor where the salt is removed from the mother liquor. A condensate is then circulated into the salt extractor and the salt slurry is then stored in a brine storage tank.

5 Claims, 3 Drawing Sheets

FIG.1

| FIG.1A | FIG.1B |

GLYCERINE FOOTS SALT SEPARATION SYSTEM

BACKGROUND OF THE INVENTION

1. Field of the Invention

The present invention relates generally to the field of separators. More specifically, the present invention relates to a system for separating salt in a glycerine refining process.

2. Background of the Prior Art

Recovery of glycerine in the typical glycerine refining process invariably involves a step wherein at least a portion of the glycerine product is distilled overhead from a salt and heavy ends bottoms product. This bottoms product known conventionally as the glycerine crude still bottom. The crude still bottom contains a large weight percentage of salt, in addition to unrecovered glycerine. The crude still bottom would be fed to the glycerine foots bottom or foots still to remove more glycerine by evaporation. The remainder of the heavy residue and salt slurry is disposed of such as in a landfill. It is becoming increasingly difficult and/or expensive to dispose of these waste streams. Methods of reducing the waste and recycling the stream are critical in the glycerine process.

SUMMARY OF THE INVENTION

The present invention provides a method and apparatus for the recovery of salt from a glycerine refining process.

Foots from a crude still bottom are transported to a foots salt settling tank. In the foot salt settling tank, the crystallized salt is allowed to settle to the bottom of the foots salt settling tank leaving a clarified liquid fraction on the top portion. An overflow outlet is positioned in a sidewall of the foots salt settling tank allowing the clarified liquid to spill over into a foot still once the clarified liquid reaches the level of the overflow outlet.

A salt receiver is positioned below the foots salt settling tank. A line feeds salt from the lower portion of the foots salt settling tank to an inlet in the top portion of the salt receiver. The salt receiver has a sight glass positioned on a sidewall. When the level of salt in the salt receiver reaches the sight glass, the salt extractor is prepared for automatic transfer of the salt from the salt receiver. When this occurs, the line between the foots salt settling tank and salt receiver is closed and a vacuum is pulled within the salt extractor.

The line between the salt receiver and salt extractor is opened to deliver the salt and mother liquor from the outlet at the bottom portion of the salt receiver to the inlet in the top portion of the salt extractor which is positioned below the salt receiver. The salt receiver is agitated so as to capture salt crystals in a mesh, and to blow back the mother liquor into the salt receiver. Once the salt has been extracted and the mother liquor substantially removed from the extractor, the salt crystals can be prepared for use in brine making.

The salt is prepared for brine making by circulating a steam condensate and delivering the slurry or brine solution to a brine storage tank.

DETAILED DESCRIPTION OF THE PREFERRED EMBODIMENTS

Figure 1A:
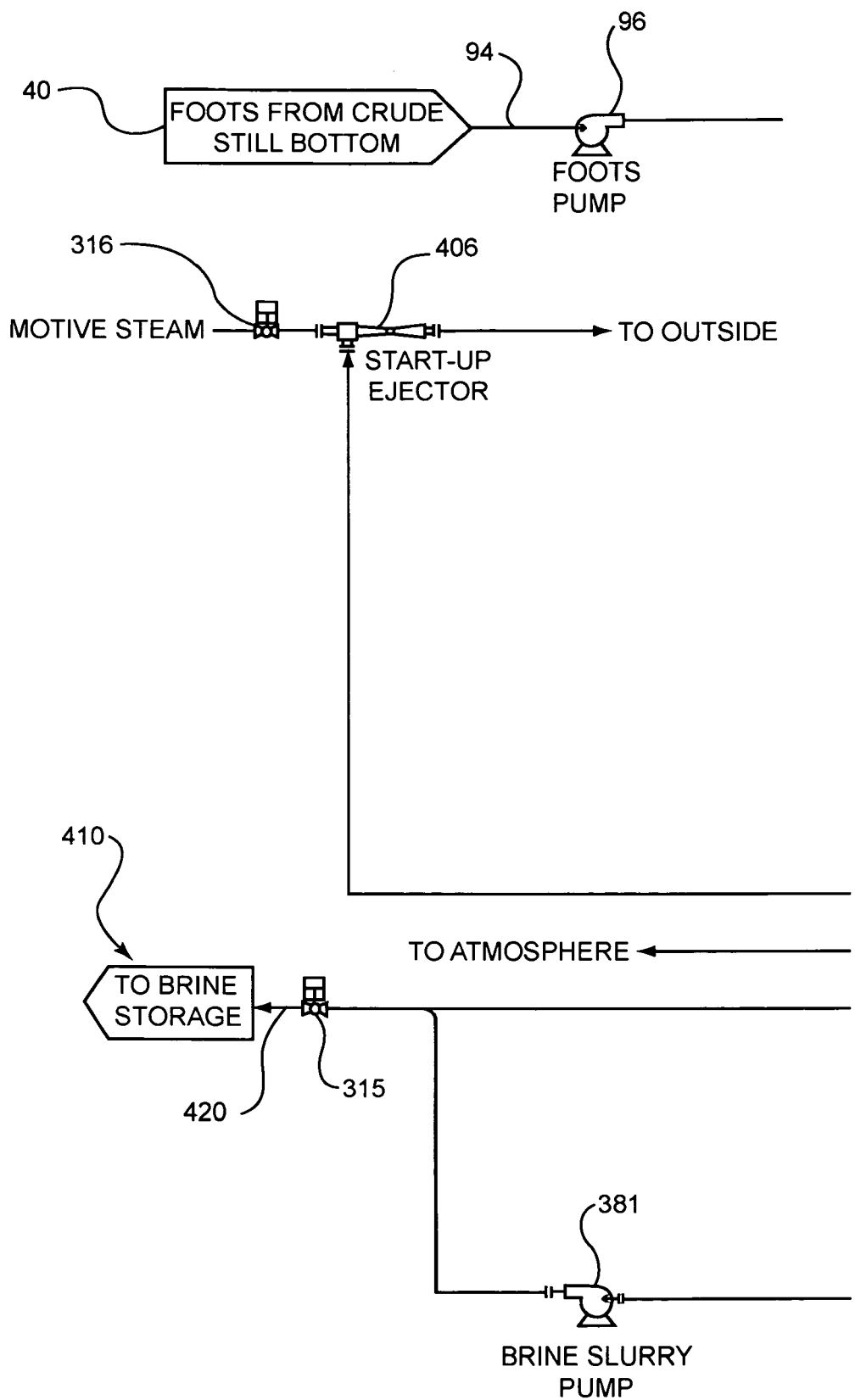
FIG. 1 is an organizational figure illustrating the relationship of what is shown schematically in FIGS. 1a and 1b.
Figure 1B:
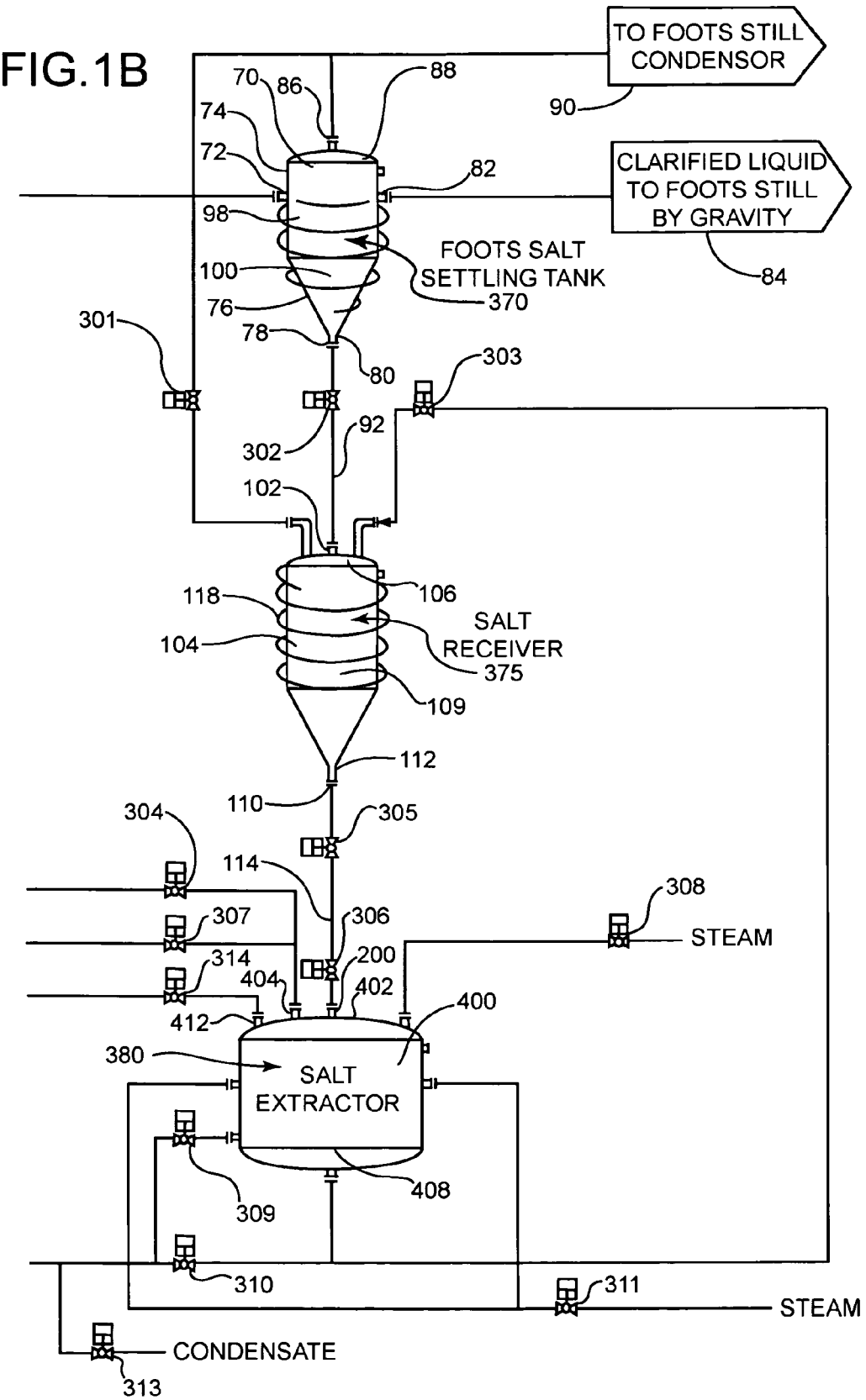

FIG. 1 shows a foots salt settling tank 370 for receiving foots 40 from a crude still bottom. The settling tank 370 includes a housing 70 for receiving foots 40 from the crude still bottom therein. The foots from the crude still bottom 40 enters the settling tank 370 through an inlet 72 in a sidewall 74 of the housing 70. The housing 70 has a conically shaped lower portion 76. An outlet 78 is positioned at the nose 80 of the lower portion 76 to provide fluid communication between the settling tank 370 and a salt receiver 375. An overflow outlet 82 is positioned in the sidewall 74 of the foots salt settling tank 370 to allow fluid communication between the foots salt settling tank 370 and a foot still 84. A top outlet 86 is positioned on a top portion 88 of the foots salt settling tank 370 to allow fluid communication with a foot still condenser 90.

In operation, a line 94 connecting the crude still bottom 40 to the inlet 72 allows the foots from the crude still bottom 40 to enter the foots salt settling tank 370. The foots from the crude still bottom 40 contains a salt slurry and glycerine, among other residue components. This foots from the crude still bottom 40 is continuously discharged by a foots pump 96 which delivers the glycerine laden residue to the foots salt settling tank 370.

The foots salt settling tank 370 is configured to separate the crystallized salt from the glycerine by allowing the crystallized salt to settle towards the bottom portion 76 of the foots salt settling tank 370, forming a foots liquid fraction 98 above the salt settling portion 100. This creates a foots liquid fraction 98 that is free of crystallized salt. The overflow outlet 82 is positioned within the foots salt settling tank 370 such that the liquid fraction 98 overflows into a foots still 84 when the level of the liquid fraction 98 reaches the overflow outlet 82. In the foots still 84, glycerine is distilled from the desalted liquid fraction, maximizing glycerine recovery yield.

A gas outlet 86 is positioned at a top portion 88 of the housing 70 for allowing gases entering and/or forming within the foots salt settling tank 370 to be removed from the foots salt settling tank 370 to a foots still condenser 90.

The bottom outlet 78 in the lower portion 76 of the foots salt settling tank 370 allows crystallized salt to pass through the outlet 78 and accumulate in the salt receiver 375. A solenoid valve 302 is positioned between the feed line 92 connecting the outlet 78 of the foots salt settling tank 370 to the inlet 102 of the salt receiver 375. In operation the valve 302 is left open to allow salt to continuously settle into the salt receiver 375.

FIG. 1 also shows the salt receiver 375. The salt receiver 375 is positioned beneath the foots salt settling tank 370. The salt receiver 375 includes a housing 104 defining a cavity for receiving crystallized salt and mother liquor from the foots salt settling tank 370 through a salt inlet 102 in a top portion 106 of the housing 104 of the salt receiver 375.

The salt receiver 375 has a conical lower portion 108 having an outlet 110 at a nose 112 for dispensing salt into a salt extractor 380 positioned below the salt receiver 375. A line 114 extending between the outlet 110 of the salt receiver 375 and an inlet 200 of the salt extractor 380 has one or more valves 305, 306 for selectively opening and closing the line 114.

A sight glass 118 is positioned in a sidewall of the housing 104 of the salt receiver 375. When the salt level in the salt receiver 375 reaches the sight glass 118, the salt extractor 380 is prepared for transfer of the salt from the salt receiver 375 to the salt extractor 380. A vacuum is pulled on the salt extractor 380 and the valves 305, 306 between the salt extractor 380 and salt receiver 375 are opened, and the valve 302 between the toots salt settling tank 370 and salt receiver 375 is closed.

Transfer of the salt from the salt receiver 375 to the salt extractor 380 is automatically initiated upon the salt reaching the level of the sight glass 118 in a sequence of actuated valves which pressurize the salt receiver 375 and generate a vacuum in the salt extractor 380. Upon completion of transfer of the salt to the salt extractor 380 the valves 305, 306 between the salt receiver 375 and salt extractor 380 are closed to allow the salt extractor 380 to extract salt.

FIG. 1 shows the salt extractor 380 for extracting crystallized salt from the mother liquor in which it is entrained. The salt extractor 380 is positioned below the salt receiver 375 and connected by a line 114 therebetween. The salt extractor 380 has a housing 400 defining a cavity for receiving the salt and mother liquor via an inlet 200 in a top portion 402 of the housing 400 of the salt extractor 380.

The salt extractor 380 is prepared for transfer of salt from the salt receiver 375 when the salt level in the salt receiver 375 has reached the sight glass 118. At such time, a vacuum is pulled on the salt extractor 380 by opening the valves 304, 316 at the vacuum outlet 404 and at the start-up ejector 406.

Salt is then discharged from the salt receiver 375 to the salt extractor 380 by opening the valves 305, 306 in the line 114, wherein at such time the valve 302 between the foots salt settling tank 370 and salt receiver 375 is closed. The valves 304, 316 used to create a vacuum remain open during this step.

When the transfer of the salt and mother liquor from the salt receiver 375 to the salt extractor 380 is complete, the in-line valves 305, 306, motive steam valve 316, and vacuum valve 304 are closed. The mother liquor is pushed back by opening the agitation valves 301, 303, 308, 311. The salt extractor 380 is further agitated by opening the lower outlet valve 310. Additional agitation is created by opening the side outlet valve 309.

The lower outlet valve 310 and side outlet valve 309 of the salt extractor 380 are then closed to push the remaining mother liquor into the salt receiver 375 via the agitation valves 301, 303, 308, 311. The lower outlet valve 310 and side outlet valve 309 may then again be reopened to continue to return the mother liquor to the salt receiver 375. This process may be repeated as necessary to achieve a predetermined extraction efficiency. Once the transfer of the mother liquor to the salt receiver 375 is complete, the agitation valves 303, 308, 311 are closed and a vacuum is pulled on the salt receiver 375 by leaving open the corresponding vacuum valve 301.

The salt extractor 380 has a filtering mesh 408 in its interior. During extraction, the salt crystals are retained in the mesh 408 and the mother liquor is separated out and blown back to the salt receiver 375. Then the foot salt settling vessel 370 and foots salt receiver 375 are put back in line to continue the salt settling process.

Once the mother liquor has been removed from the extractor 380 leaving only salt crystals, the salt crystals can be used to make brine by filling the salt extractor 380 with condensate and circulating it in the foots salt extractor 380 by opening a condensate inlet and circulation valves 304, 313, 314, 316 and corresponding pump 381, while maintaining the vacuum valve 301 in salt receiver 375 open.

The salt in the salt extractor 380 is mixed with steam condensate and the slurry or brine solution is sent to the brine storage 410.

To make brine, the salt extractor 380 is filled with condensate, which is circulated therein. The condensate enters the salt extractor 380 through a condensate inlet valve 412. Condensate is circulated by opening a series of circulation valves 304, 313, 314 and a steam valve 316 and pumping the condensate by a pump 381. The vacuum valve 301 in the salt receiver 375 is kept open during this process.

Once the condensate has circulated and filled the salt extractor 380, the condensate inlet valve 313, vacuum valve 301 and steam valve 316 are closed. The steam agitator valve 307 is used to vent to atmosphere, when circulating and agitating the salt extractor 380. Agitation is stopped by closing the steam agitator valve 311 and continuing to circulate the condensate.

The foots salt settling tank 370 and salt receiver 375 are put back in line by opening the in-line valve 302. Brine is emptied from the salt extractor 380 into a brine holding tank 410 by closing the upper agitation valve 314 and opening the brine holding tank inlet valve 315 allowing the previously recirculated brine to be sent to the brine storage 410 via an outlet line 420.

After the extraction of salt a vacuum is pulled on the salt extractor 375, and the pump 381 is shut off.

What is claimed is:

1. A method for recovering salt from a glycerine refining process residue, comprising:
   a) providing a settling tank with an upper inlet through which liquid residue from a glycerine refining process is introduced into said settling tank, a conical shaped bottom onto which salt in the residue falls, and an overflow outlet positioned between the upper inlet and the bottom through which liquid is discharged;
   b) providing a receiving tank located below the settling tank which is arranged to receive salt from the settling tank, and
   c) providing a salt extractor located below the receiving tank which is arranged to receive solid material from the receiving tank and water from another source and to discharge the mixture;
   d) a first step of directing liquid obtained from the glycerine refining process containing salt into the upper inlet of the settling tank;
   e) a second step of allowing the liquid to settle in the settling tank then discharging the liquid obtained through the overflow outlet and transferring salt collected at the bottom of the settling tank to the receiving tank;
   f) a third step of transferring salt from the receiving tank to the extractor; and
   g) a fourth step of introducing water into the extractor to dilute the salt received from the receiving tank and then discharge the diluted mixture for collection.

2. The method of claim 1 further comprising:
   a) providing said salt settling tank with a sidewall outlet in a sidewall for overflow of a clear liquid fraction;
   b) adding a first step between the directing and allowing steps of directing the clear liquid fraction through the sidewall outlet for overflow.

3. The method of claim 2 further comprising:
a) providing a foots still and connection from said sidewall outlet to said foots still; and
b) adding a step between the first step and the third step comprising overflowing said clear liquid fraction through said sidewall outlet.

4. The method of claim 3 further comprising:
a) providing apparatus to automatically provide salt from said salt receiving tank to said salt extractor; and
b) adding a step between the overflowing step and the third step of automatically providing salt from said salt settling tank to said salt extractor.

5. The method of claim 4 further comprising:
a) providing the salt receiver with a sight glass; and
b) adding a step between the automatically providing step and the third step of determining the salt level using said sight glass.

* * * * *